(12) United States Patent
Kurata

(10) Patent No.: US 10,546,230 B2
(45) Date of Patent: Jan. 28, 2020

(54) GENERATING LABELED DATA BY SEQUENCE-TO-SEQUENCE MODELING WITH ADDED PERTURBATIONS TO ENCODED INFORMATION

(71) Applicant: INTERNATIONAL BUSINESS MACHINES CORPORATION, Armonk, NY (US)

(72) Inventor: Gakuto Kurata, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 756 days.

(21) Appl. No.: 15/236,197

(22) Filed: Aug. 12, 2016

(65) Prior Publication Data

US 2018/0046912 A1 Feb. 15, 2018

(51) Int. Cl.
*G06N 5/04* (2006.01)
*G06N 3/04* (2006.01)

(52) U.S. Cl.
CPC ............. *G06N 3/0454* (2013.01); *G06N 5/04* (2013.01)

(58) Field of Classification Search
CPC ...................................................... G06N 5/04
USPC ........................................................ 706/45
See application file for complete search history.

(56) References Cited

U.S. PATENT DOCUMENTS

2018/0025721 A1\* 1/2018 Li ........................... G10L 15/16
704/232

OTHER PUBLICATIONS

Kiros et al ("Unifying Visual-Semantic Embeddings with Multimodal Neural Language Models" 2014) (Year: 2014).\*
Wang et al ("Memory-enhanced Decoder for Neural Machine Translation" Jun 2016) (Year: 2016).\*
Kyunghyun Cho ("Noisy Parallel Approximate Decoding for Conditional Recurrent Language Model" May 2016) (Year: 2016).\*
Kamakshi et al ("A Novel Framework to Improve the Quality of Additive Perturbation Technique" 2011). (Year: 2011).\*
Tam, et al., "RNN-based Labeled Data Generation for Spoken Language Understanding", Interspeech Sep. 2015, pp. 125-129.

\* cited by examiner

*Primary Examiner* — Lut Wong
(74) *Attorney, Agent, or Firm* — Tutunjian & Bitetto, P.C.; Vazken Alexanian

(57) ABSTRACT

Methods and a system are provided for generating labeled data. A method includes encoding, by a processor-based encoder, a first labeled data into an encoded representation of the first labeled data. The method further includes modifying the encoded representation into a modified representation by adding a perturbation to the encoded representation. The method additionally includes decoding, by a processor-based decoder, the modified representation into a second labeled data.

23 Claims, 14 Drawing Sheets

GENERATING LABELED DATA BY SEQUENCE-TO-SEQUENCE MODELING WITH ADDED PERTURBATIONS TO ENCODED INFORMATION

BACKGROUND

Technical Field

The present invention relates generally to information processing and, in particular, to generating labeled data by sequence-to-sequence modeling with added perturbations to encoded information.

Description of the Related Art

The preparation of training data for sequence labeling is costly. A typical sequence labeling task includes semantic slot filling, which is an essential component of natural language understanding (NLU). In the very initial stage of a NLU system before the system launches, user logs that can be used as training data after labeling with an existing model are not yet available.

The generation of training data using the model from the existing labeled data has been tried. For example, a Recurrent Neural Network (RNN) that uses pairs of a word and its label as a modeling unit has been recently proposed. However, no improvement in sequential labeling was found by augmenting the training data with the generated data of the previous approach. Moreover, a shortcoming of the previous approach is that only the pairs appearing in the training data can be generated, since the pairs of word and label are used as a modeling unit. Another issue with the preceding approach is that the variety of the generated data is limited due to the strong modeling power of the RNN. Thus, there is a need for an approach for generating labeled data.

SUMMARY

According to an aspect of the present principles, a method is provided for generating labeled data. The method includes encoding, by a processor-based encoder, a first labeled data into an encoded representation of the first labeled data. The method further includes modifying the encoded representation into a modified representation by adding a perturbation to the encoded representation. The method additionally includes decoding, by a processor-based decoder, the modified representation into a second labeled data.

According to another aspect of the present principles, a computer program product is provided for generating labeled data. The computer program product includes a non-transitory computer readable storage medium having program instructions embodied therewith. The program instructions executable by a computer to cause the computer to perform a method. The method includes encoding, by a processor-based encoder, a first labeled data into an encoded representation of the first labeled data. The method further includes modifying the encoded representation into a modified representation by adding a perturbation to the encoded representation. The method also includes decoding, by a processor-based decoder, the modified representation into a second labeled data.

According to yet another aspect of the present principles, a system is provided for generating labeled data. The system includes a processor and a memory, configured to encode a first labeled data into an encoded representation of the first labeled data. The processor and the memory are further configured to modify the encoded representation into a modified representation by adding a perturbation to the encoded representation. The processor and the memory are also configured to decode the modified representation into a second labeled data.

According to still another aspect of the present principles, a method is provided for generating labeled data. The method includes encoding, by a long short-term memory processor-based encoder, a first labeled data into an encoded representation of the first labeled data. The encoded representation has an encoded hidden vector and an encoded memory cell vector. The method further includes modifying the encoded representation into a modified representation by adding a perturbation to at least one of the vectors in the encoded representation. The perturbation is selected from the group consisting of an additive perturbation and a multiplicative perturbation. The method also includes decoding, by a long short-term memory processor-based decoder, the modified representation into a second labeled data.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to generating labeled data by sequence-to-sequence modeling with added perturbations to encoded information.

In an embodiment, the present principles use sequence-to-sequence modeling to generate labeled training data. In an embodiment, arbitrary modeling units and architectures can be used both for input and output sequences. In an embodiment, separate output sequences are used for words and labels to obtain new pairs of word and label.

In an embodiment, the present principles add perturbations to the encoded vector to generate a variety of sequences which are similar, but not identical, to the input sequence.

Figure 1:
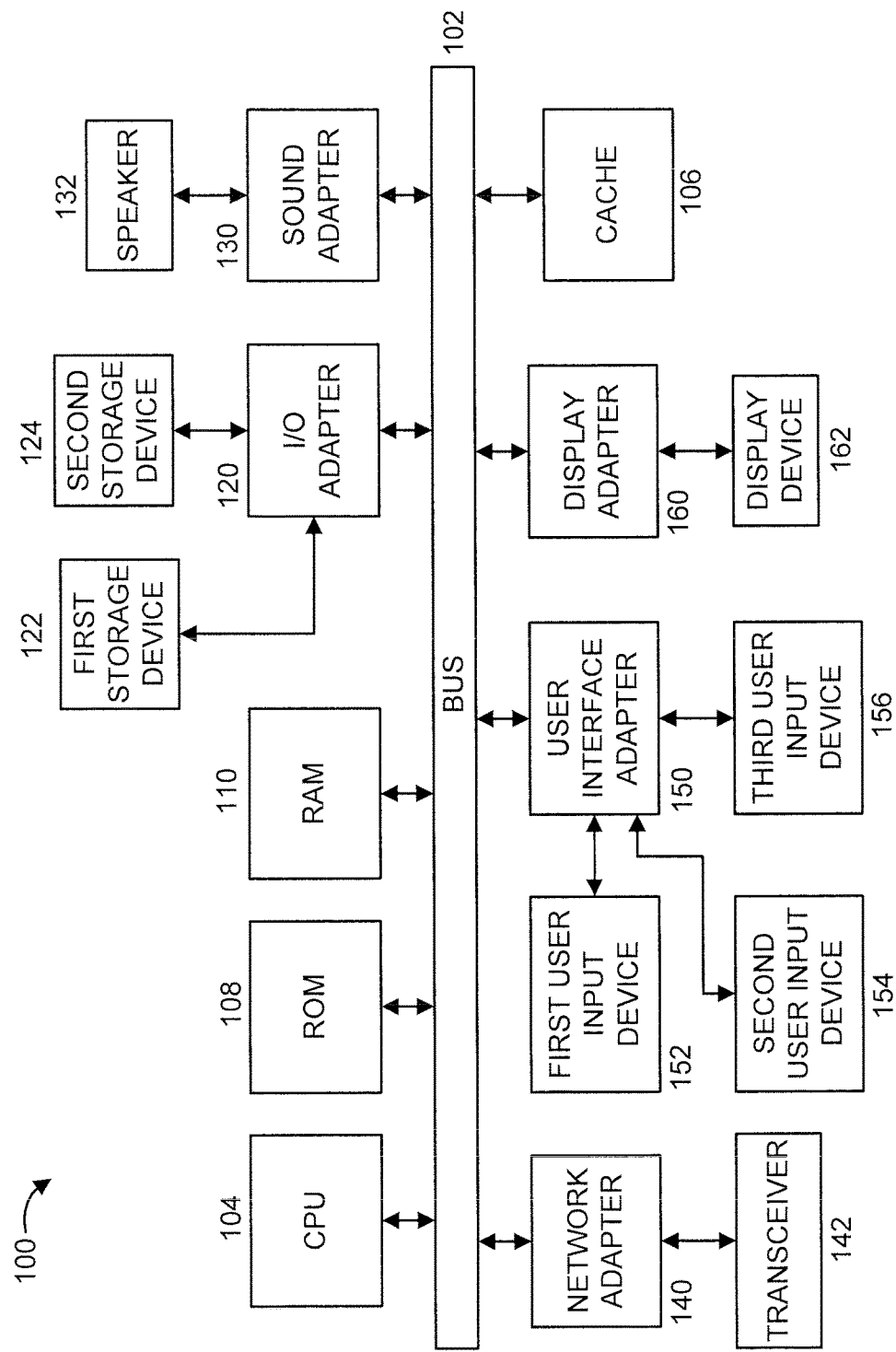
FIG. 1 shows an exemplary processing system to which the present principles can be applied, in accordance with an embodiment of the present principles.

FIG. 1 shows an exemplary processing system 100 to which the present principles can be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
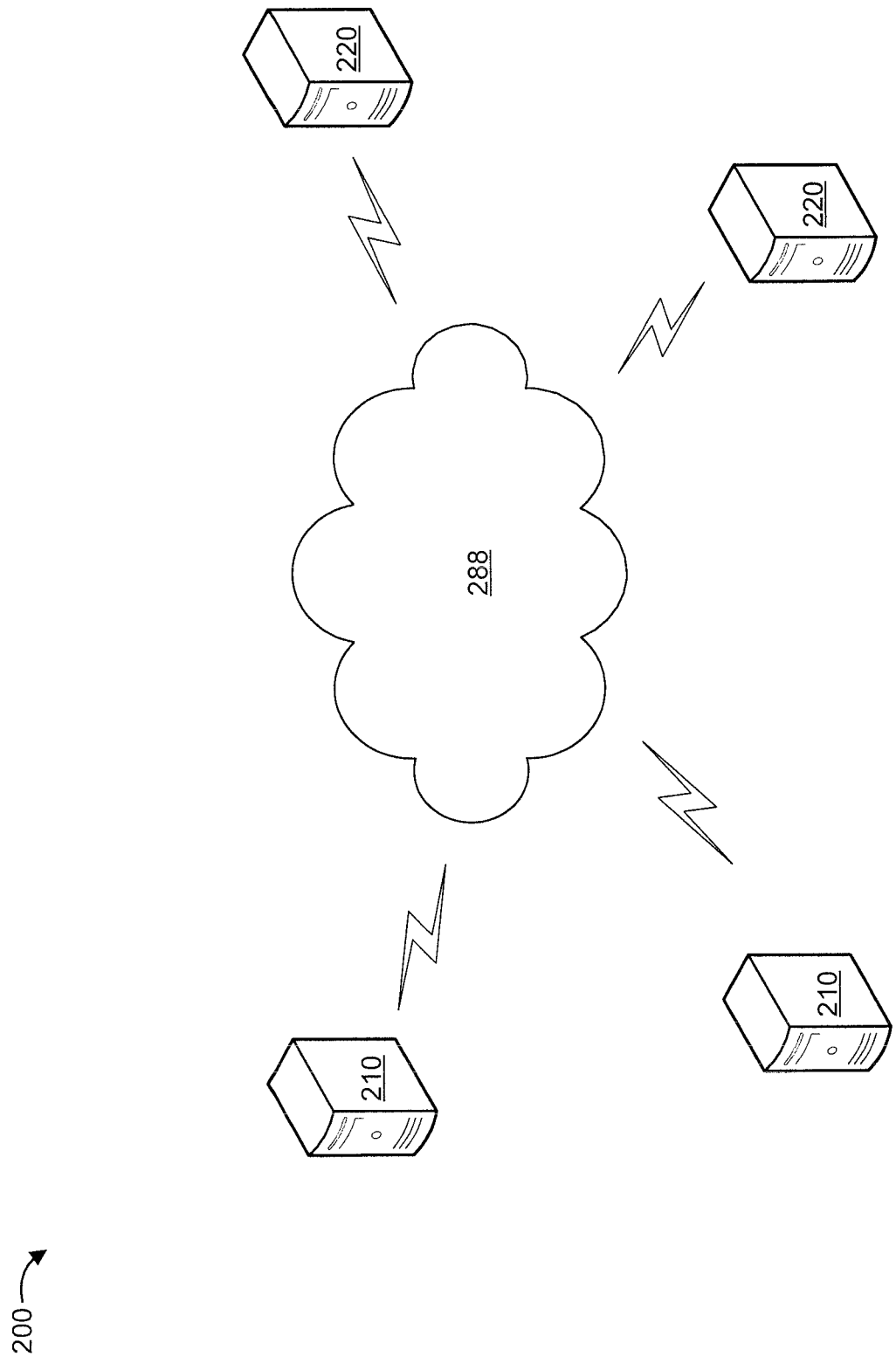
FIG. 2 shows an exemplary operating environment to which the present principles can be applied, in accordance with an embodiment of the present principles.

Moreover, it is to be appreciated that operating environment 200 described below with respect to FIG. 2 is an operating environment for implementing respective embodiments of the present principles. Part or all of processing system 100 may be implemented in one or more of the elements of operating environment 200.

Also, it is to be appreciated that architectures 700-1100 described below with respect to FIGS. 7-11 are architectures for implementing respective embodiments of the present principles. Part or all of processing system 100 may be implemented in one or more of the elements of one or more of architectures 700-1100.

Figure 3:
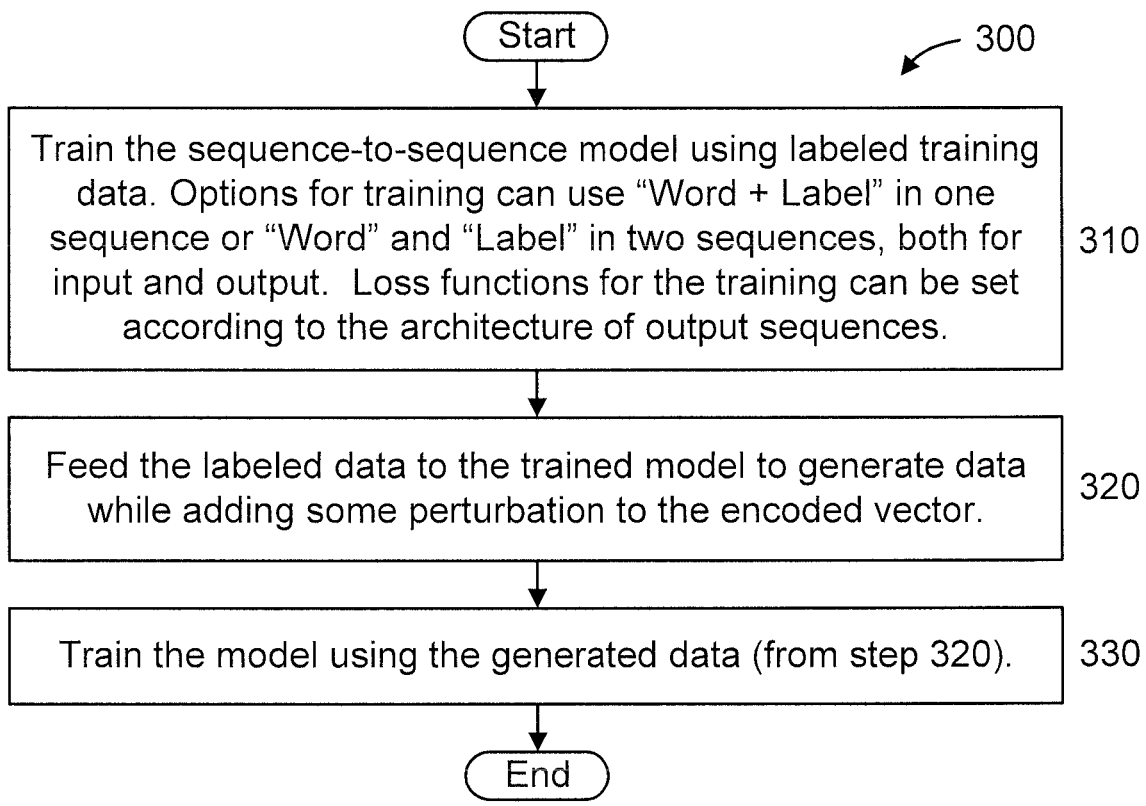
FIG. 3 shows an exemplary method for training a sequence-to-sequence model, in accordance with an embodiment of the present principles.
Figure 4:
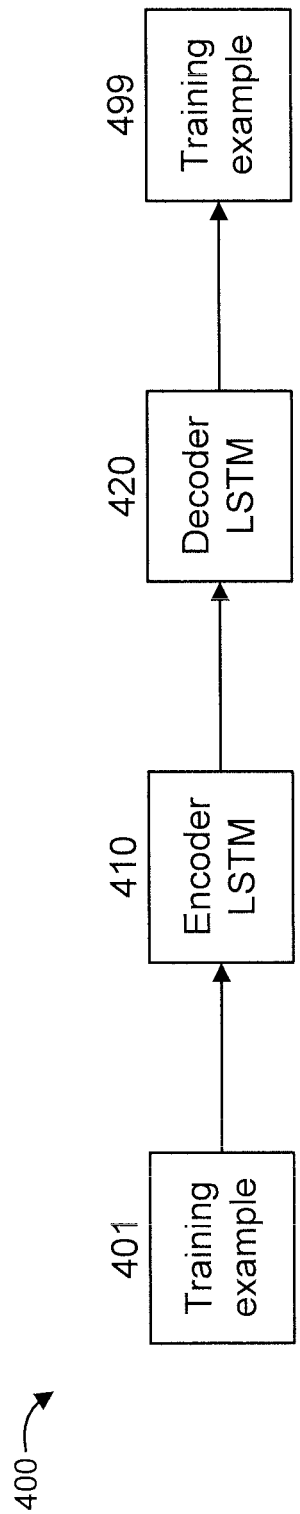
FIG. 4 shows an exemplary method for training a sentence auto-encoder, in accordance with an embodiment of the present principles.
Figure 5:
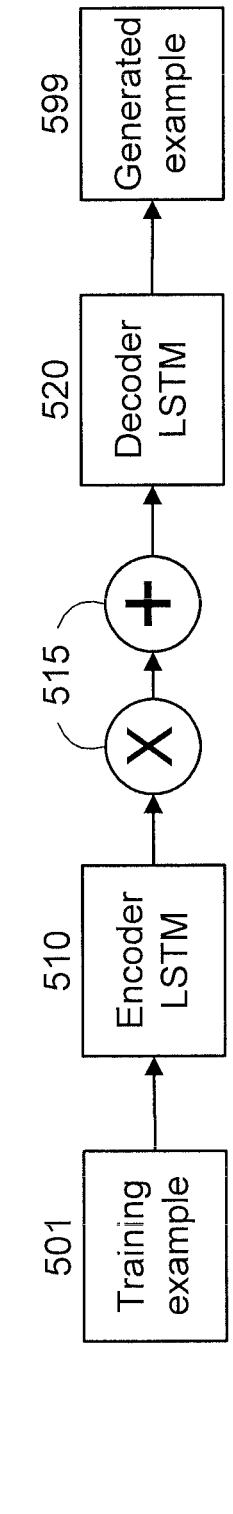
FIG. 5 shows another exemplary method for label generation, in accordance with an embodiment of the present principles.
Figure 12:
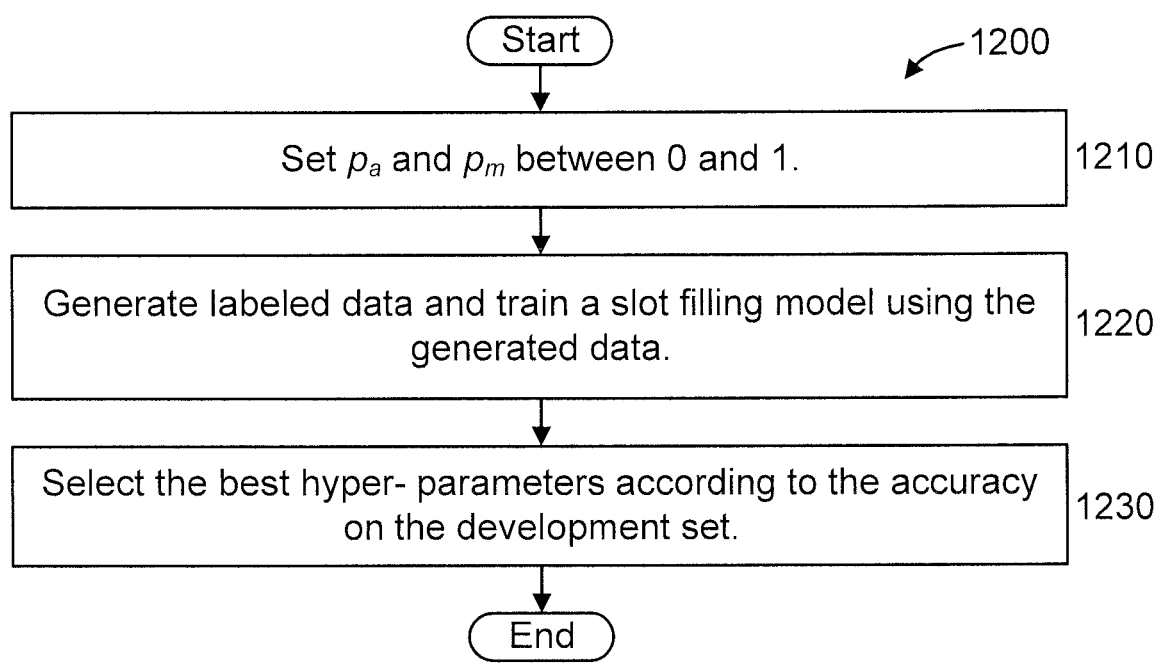
FIG. 12 shows an exemplary method for including perturbation to an encoded sequence, in accordance with an embodiment of the present principles.
Figure 13:
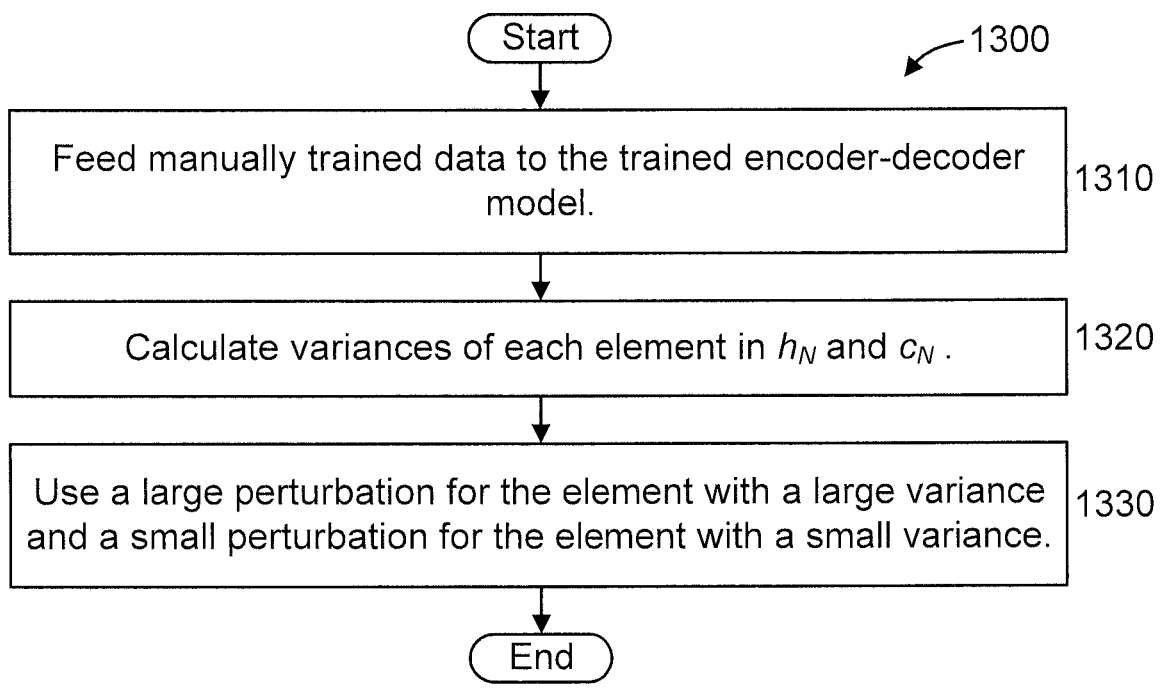
FIG. 13 shows another exemplary method for including perturbation to an encoded sequence, in accordance with an embodiment of the present principles.

Further, it is to be appreciated that processing system 100 may perform at least part of the method described herein including, for example, at least part of method 300 of FIG. 3 and/or at least part of method 400 of FIG. 4 and/or at least part of method 500 of FIG. 5 and/or at least part of method 1200 of FIG. 12 and/or at least part of method 1300 of FIG. 13. Similarly, part or all of system 200 may be used to perform at least part of method 300 of FIG. 3 and/or at least part of method 400 of FIG. 4 and/or at least part of method 500 of FIG. 5 and/or at least part of method 1200 of FIG. 12 and/or at least part of method 1300 of FIG. 13.

Further, it is to be appreciated that processing system 100 may perform at least part of the method described herein including, for example, at least part of method 300 of FIG. 3 and/or at least part of method 400 of FIG. 4 and/or at least part of method 500 of FIG. 5 and/or at least part of method 1200 of FIG. 12 and/or at least part of method 1300 of FIG. 13. Similarly, part or all of operating environment 200 may be used to perform at least part of method 300 of FIG. 3 and/or at least part of method 400 of FIG. 4 and/or at least part of method 500 of FIG. 5 and/or at least part of method 1200 of FIG. 12 and/or at least part of method 1300 of FIG. 13. Additionally, part or all of any of architectures 700-1100 may be used to perform at least part of method 300 of FIG. 3 and/or at least part of method 400 of FIG. 4 and/or at least part of method 500 of FIG. 5 and/or at least part of method 1200 of FIG. 12 and/or at least part of method 1300 of FIG. 13.

FIG. 2 shows an exemplary operating environment 200 to which the present principles can be applied, in accordance with an embodiment of the present principles.

The operating environment 200 includes a set of computing devices (collectively and individually denoted by the figure reference numeral 210). Any of computing devices 210 can be configured to implement the present principles. The computing devices 210 can be any type of computing device capable of generating labeled data as described herein. The computing devices 210 can be, but are not limited to, servers, desktop computers, mobile computers, smart telephones, media players, tablets, laptops, and so forth.

In an embodiment, the computing devices 210 can access information on a set of remote servers (collectively and individually denoted by the figure reference numeral 220). The information on the set of servers can be information used for model training and/or label generation. The exchange of information between the set of computing devices 210 and/or between the set of computing devices 210 and the set of remote servers 220 can occur over one or more networks (collectively denoted by the figure reference numeral 288). The one or more networks 288 can include any type of networks such as, for example, but not limited to, cellular networks, local area networks, wide area networks, personal area networks, wireless networks, wired networks, any combination of the preceding, and so forth. In the embodiment of FIG. 2, the one or more networks 288 are implemented by one or more wireless networks for the sake of illustration.

In the embodiment shown in FIG. 2, the elements thereof are interconnected by network(s) 288. However, in other embodiments, other types of connections can also be used. Moreover, one or more elements of FIG. 2 can be implemented in a cloud configuration including, for example, in a distributed configuration. Additionally, one or more elements in FIG. 2 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of system 200 are readily determined by one of ordinary skill in the art, given the teachings of the present principles provided herein, while maintaining the spirit of the present principles.

FIG. 3 shows an exemplary method 300 for training a sequence-to-sequence model, in accordance with an embodiment of the present principles.

At step 310, train the sequence-to-sequence model using labeled training data. In an embodiment, options for training can use "Word+Label" in one sequence or "Word" and "Label" in two sequences, both for input and output. In an embodiment, loss functions for the training can be set according to the architecture of output sequences.

At step 320, feed the labeled data to the trained model to generate data while adding some perturbation to the encoded vector.

At step 330, train the model using the generated data (from step 320).

FIG. 4 shows an exemplary method 400 for training a sentence auto-encoder, in accordance with an embodiment of the present principles.

The training method 400 involves inputting a training example 401 into an encoder (backward) Long Short-Term Memory (LSTM) 410. The encoder LSTM 410 encodes the training example 401 to output an encoded training example. The encoded training example is input to a decoder LSTM 420. The decoder LSTM 420 decodes the encoded training example to output a decoded training example 499.

FIG. 5 shows another exemplary method 500 for label generation, in accordance with an embodiment of the present principles.

The label generation method 500 involves inputting a training example 501 into an encoder (backward) Long Short-Term Memory (LSTM) 510. The encoder LSTM 510 encodes the training example 501 to output an encoded training example. A perturbation system 515 adds perturbations to hidden units and memory cells of the encoded training example when generating sequences to output an encoded and perturbed training example. The encoded and perturbed training example is input to a decoder LSTM 520.

The decoder LSTM 520 decodes the encoded and perturbed training example to output a decoded generated example 599.

Thus, when training (as per method 400), the input sequence (training example 401) and the output sequence (training example 499) are identical, and perturbation is not added. In contrast, when generating labels (as per method 500), perturbation is added to hidden units and memory cells that encodes the input sequence, such that an output sequence (generated example 599) is generated that is different from the input sequence (501).

The encoder LSTM and decoder LSTM described in FIGS. 4 and 5 can be considered to form an encoder-decoder LSTM that maps input and output sequences with arbitrary length. The encoder-decoder LSTM first encodes the input sequence into a fixed-sized vector using one LSTM (encoder LSTM) and then generates the output sequence by decoding the encoded vector by another LSTM (decoder LSTM) whose hidden parameters are initialized with the encoded vector by the encoder LSTM. The LSTM parameters are optimized to maximize the log probability of the output sequences given the input sequences. When generating the sentences using the trained encoder-decoder LSTM, the most likely output sequence given the input sequence is generated. The simple left-to-right beam search decoder is used when generating sequences.

Figure 6:
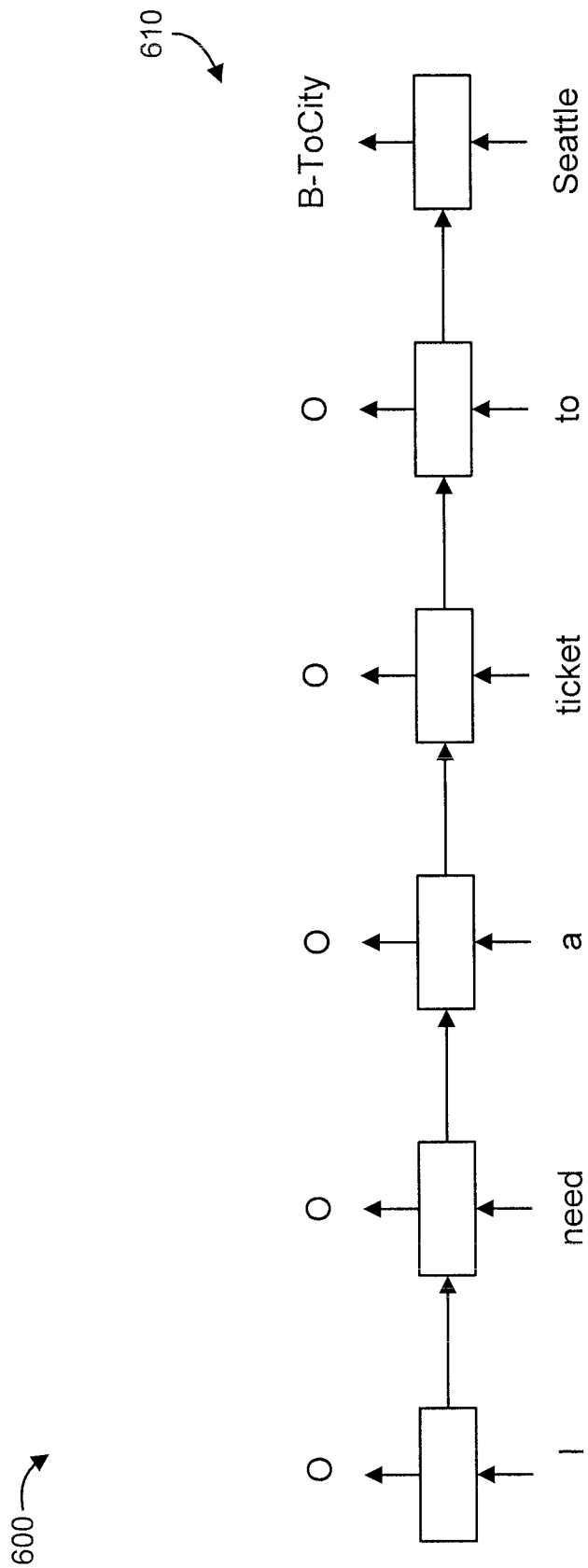
FIG. 6 shows a slot filling example, in accordance with an embodiment of the present principles.

FIG. 6 shows a slot filling example 600, in accordance with an embodiment of the present principles.

In the slot filling example 600, a labeler LSTM 610 is shown. Words are fed to the labeler LSTM 610. In this example, the input sentence is "I need a ticket to Seattle". "B-ToCity" is a slot label for a specific meaning and "O" is a slot label without a specific meaning.

In an embodiment, the following LSTM architecture is used:

$$i_t = \tan h(W_{xi}x_t + W_{hi}h_{t-1} + b_i)$$

$$j_t = \text{sigm}(W_{xj}x_t + W_{hj}h_{t-1} + b_j)$$

$$f_t = \text{sigm}(W_{xf}x_t + W_{hf}h_{t-1} + b_f)$$

$$o_t = \text{sigm}(W_{xo}x_t + W_{ho}h_{t-1} + b_o)$$

$$c_t = c_{t-1} \odot f_t + i_t \odot j_t$$

$$h_t = \tan h(c_t) \odot o_t$$

where $i_t$ denotes the non-linearly transformed value from the input and the previous hidden state, $j_t$ denotes the value of input gate, $f_t$ denotes the value of forget gate, $o_t$ denotes the value of output gate, $x_t$ denotes the input to the LSTM at time step t, W* denotes the weight matrices, and b* denotes the bias vectors, $\odot$ denotes an element-wise product, $c_t$ and $h_t$ represent the memory cell vector and the hidden vector at the time step t.

Thus, the present principles can utilize multiplicative perturbation and/or additive perturbation. These two types of perturbation can be added to the encoded information before generating sequences. Presuming that the length of the input labeled data is N, the encoder LSTM encodes it information to the hidden vector $h_N$ and the memory cell $c_N$.

For additive perturbation, the following applies:

$$\widehat{h_N} = h_N + A^h$$

$$\widehat{c_N} = c_N + A^c$$

where $A^h$ and $A^c$ are vectors whose size are the same with $h_N$ and $c_N$ and consist of independent random variables sampled from uniform distributions between $-p_a$ and $+p_a$.

For multiplicative perturbation, the following applies:

$$\widehat{h_N} = h_N \odot M^h$$

$$\widehat{c_N} = c_N \odot M^c$$

where $M^h$ and $M^c$ are vectors whose size are the same with $h_N$ and $c_N$ and consist of independent random variables sampled from uniform distributions between $1-p_m$ and $1+p_m$. $\odot$ denotes an element-wise product.

FIGS. 12 and 13 describe two exemplary examples relating to perturbation, in accordance with an embodiment of the present principles.

In FIGS. 7-11, "W" denotes a word, "L" denotes a label, "W/L" denotes a word and label pair, and <B> denotes beginning symbols for output sequences. Reference to "LSTM" refers to a LSTM layer in the depicted architecture, while reference to "embedding" or "embed" refers to an embedding layer in the depicted architecture.

Figure 7:
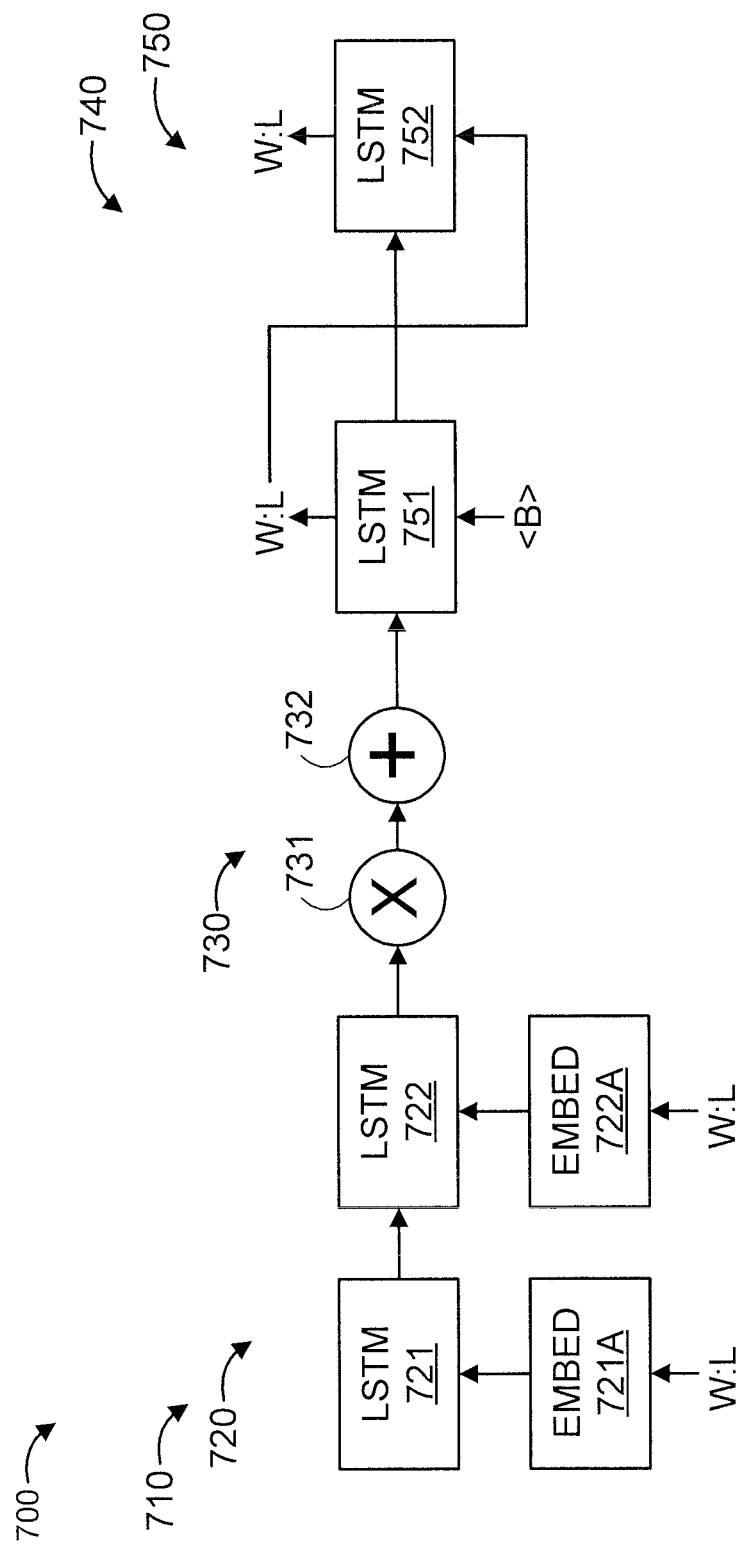
FIG. 7 shows an exemplary encoder-decoder model architecture for performing step 310 of FIG. 3, in accordance with an embodiment of the present principles.

FIG. 7 shows an exemplary encoder-decoder model architecture (hereinafter "architecture" in short) 700 for performing step 310 of FIG. 3, in accordance with an embodiment of the present principles. As a modeling unit, the architecture 700 uses a pair formed from (i) a word and (ii) a label (for that word). Thus, the input and output sequences are pairs of (i) a word and (ii) a label (for that word). The architecture 700 involves setting a loss function when training that maximizes the log probability of the output sequence of pairs of word and label, that is, setting Loss(W:L). The architecture 700 is simple and stable. While the architecture 700 is limited to existing pairs of words and labels, a wide variety of sequences can be generated by adding perturbation.

The architecture 700 includes an encoder system 710, a perturbation system 730, and a decoder system 740.

The encoder system 710 includes an encoder Long Short-Term Memory (LSTM) 720 having a first LSTM block 721 and a second LSTM block 722. An embedding block 721A is connected to the first LSTM block 721, and an embedding block 722A is connected to the second LSTM block 722.

The perturbation system 730 includes a multiplicative perturbation generator 731 and an additive perturbation generator 732.

The decoder system 740 includes a decoder LSTM 750 having a first LSTM block 751 and a second LSTM block 752.

Figure 8:
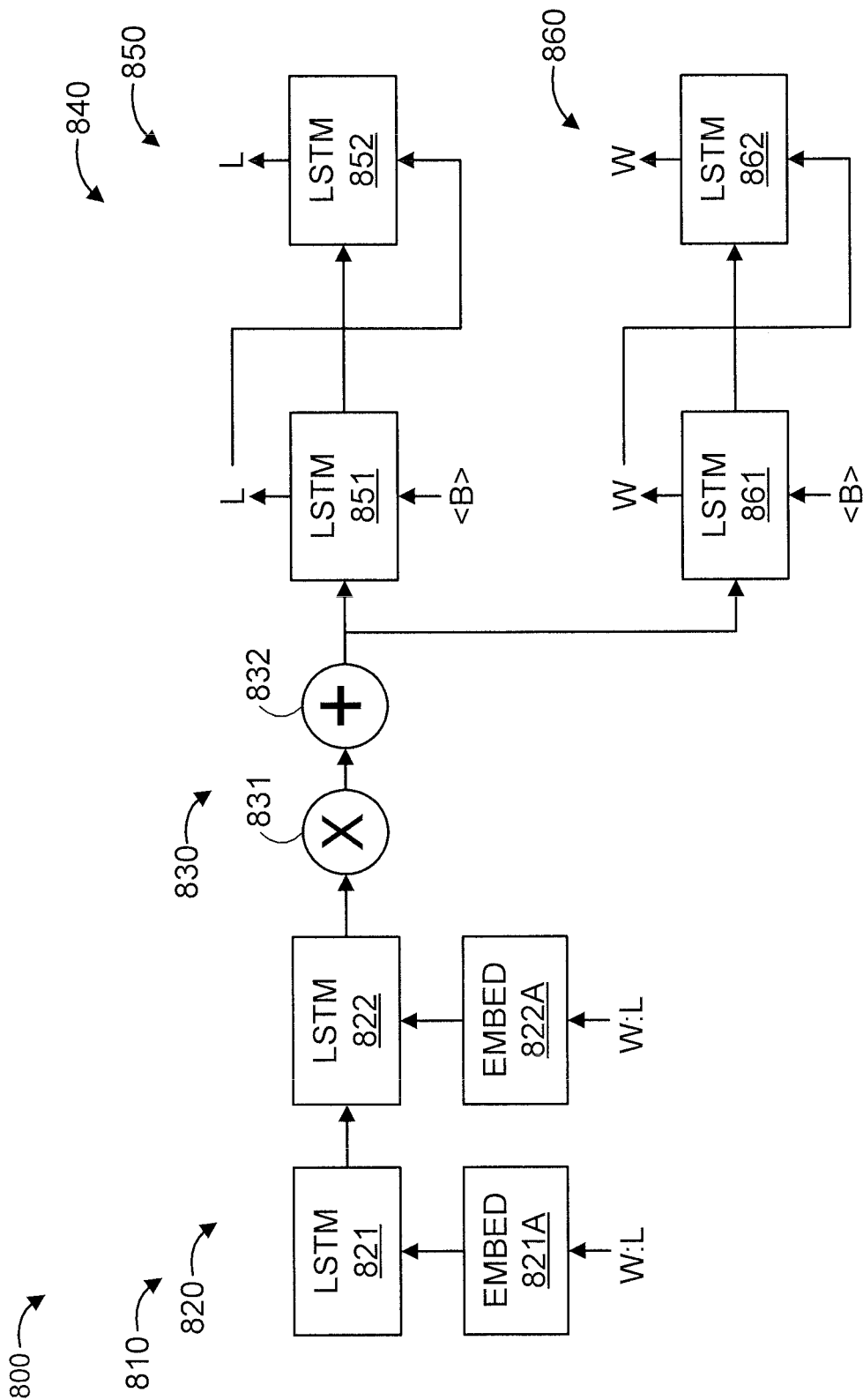
FIG. 8 shows another exemplary encoder-decoder model architecture for performing step 310 of FIG. 3, in accordance with an embodiment of the present principles.

FIG. 8 shows another exemplary encoder-decoder model architecture (hereinafter "architecture" in short) 800 for performing step 310 of FIG. 3, in accordance with an embodiment of the present principles.

The architecture 800 is similar to architecture 700, but has two independent output sequences, one for words and the other for labels. This means that architecture 800 has two different decoder LSTMs, one for word sequences and the other for label sequences. Two loss functions to maximize the log probabilities of the output word sequences Loss(W) and the output label sequences Loss(L) are summed up for training. That is, the weighted sum of Loss(W) and Loss(L) are used for model training. The architecture 800 is not limited to existing pairs of words and labels. Moreover, there is no relation between words and labels when generating sequences. Since output word sequences and label sequences are independently generated, only the combinations of generated word and label sequences that have the same length are used as the generated labeled data.

The architecture 800 includes an encoder system 810, a perturbation system 830, and a decoder system 840.

The encoder system 810 includes an encoder Long Short-Term Memory (LSTM) 820 having a first LSTM block 821 and a second LSTM block 822. An embedding block 821A is connected to the first LSTM block 821, and an embedding block 822A is connected to the second LSTM block 822. Each of the embedding blocks 821A and 822A receive a respective W/L pair.

The perturbation system 830 includes a multiplicative perturbation generator 831 and an additive perturbation generator 832.

The decoder system 840 includes a first decoder LSTM 850 and a second decoder LSTM 860. The decoder first LSTM 850 has a first LSTM block 851 and a second LSTM block 852. The second decoder LSTM 860 has a first LSTM block 861 and a second LSTM block 862.

Figure 9:
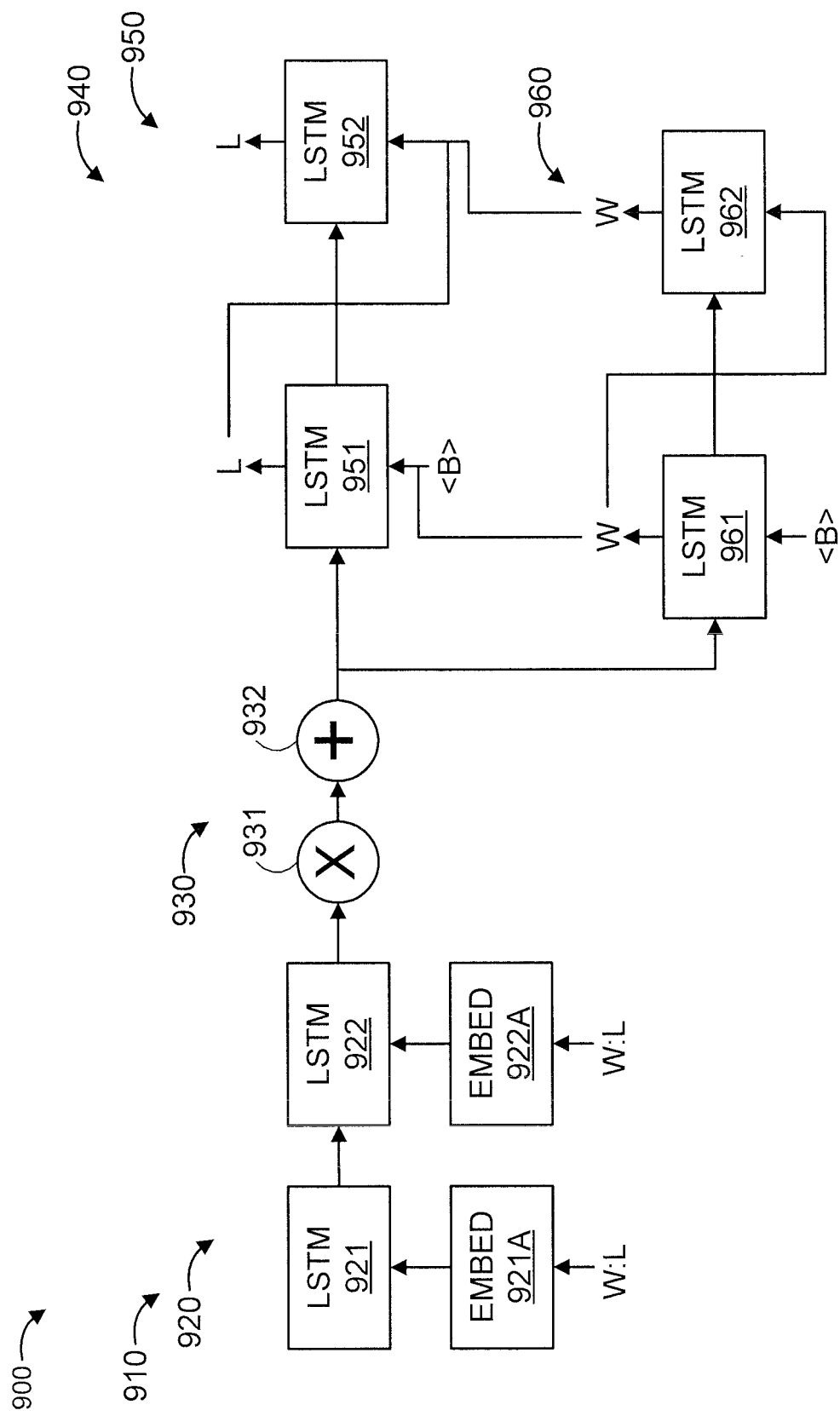
FIG. 9 shows yet another exemplary encoder-decoder model architecture for performing step 310 of FIG. 3, in accordance with an embodiment of the present principles.

FIG. 9 shows yet another exemplary encoder-decoder model architecture (hereinafter "architecture" in short) 900 for performing step 310 of FIG. 3, in accordance with an embodiment of the present principles.

The architecture 900 uses generated words for label generation.

The architecture 900 includes an encoder system 910, a perturbation system 930, and a decoder system 940.

The encoder system 910 includes an encoder Long Short-Term Memory (LSTM) 920 having a first LSTM block 921 and a second LSTM block 922. An embedding block 921A is connected to the first LSTM block 921, and an embedding block 922A is connected to the second LSTM block 922. Each of the embedding blocks 921A and 922A receive a respective W/L pair.

The perturbation system 930 includes a multiplicative perturbation generator 931 and an additive perturbation generator 932.

The decoder system 940 includes a first decoder LSTM 950 and a second decoder LSTM 960. The decoder first LSTM 950 has a first LSTM block 951 and a second LSTM block 952. The second decoder LSTM 960 has a first LSTM block 961 and a second LSTM block 962.

Figure 10:
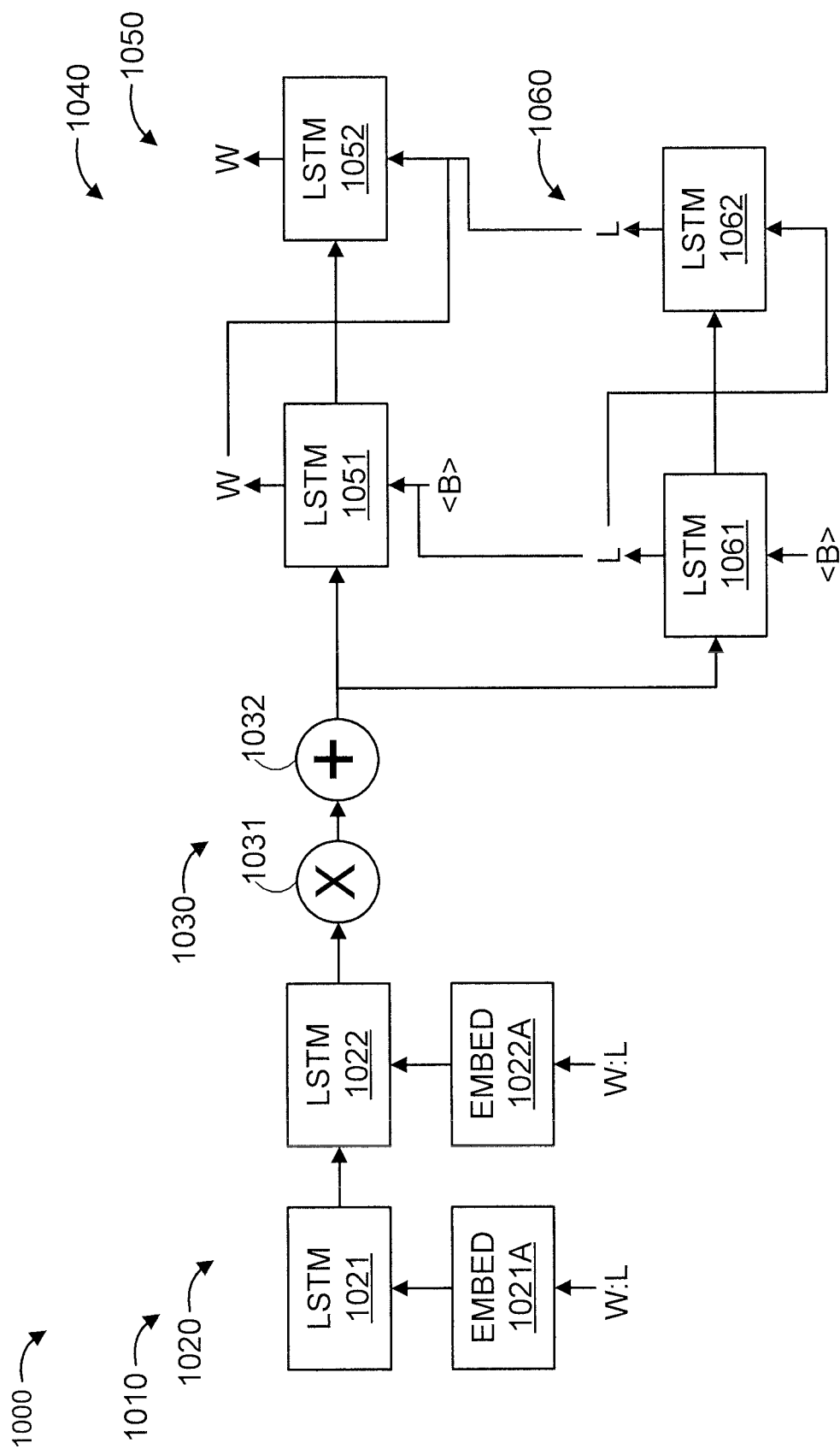
FIG. 10 shows still another exemplary encoder-decoder model architecture for performing step 310 of FIG. 3, in accordance with an embodiment of the present principles.

FIG. 10 shows still another exemplary encoder-decoder model architecture (hereinafter "architecture" in short) 1000 for performing step 310 of FIG. 3, in accordance with an embodiment of the present principles.

The architecture 1000 uses generated labels for word generation.

The architecture 1000 includes an encoder system 1010, a perturbation system 1030, and a decoder system 1040.

The encoder system 1010 includes an encoder Long Short-Term Memory (LSTM) 1020 having a first LSTM block 1021 and a second LSTM block 1022. An embedding block 1021A is connected to the first LSTM block 1021, and an embedding block 1022A is connected to the second LSTM block 1022. Each of the embedding blocks 1021A and 1022A receive a respective W/L pair.

The perturbation system 1030 includes a multiplicative perturbation generator 1031 and an additive perturbation generator 1032.

The decoder system 1040 includes a first decoder LSTM 1050 and a second decoder LSTM 1060. The decoder first LSTM 1050 has a first LSTM block 1051 and a second LSTM block 1052. The second decoder LSTM 1060 has a first LSTM block 1061 and a second LSTM block 1062.

Figure 11:
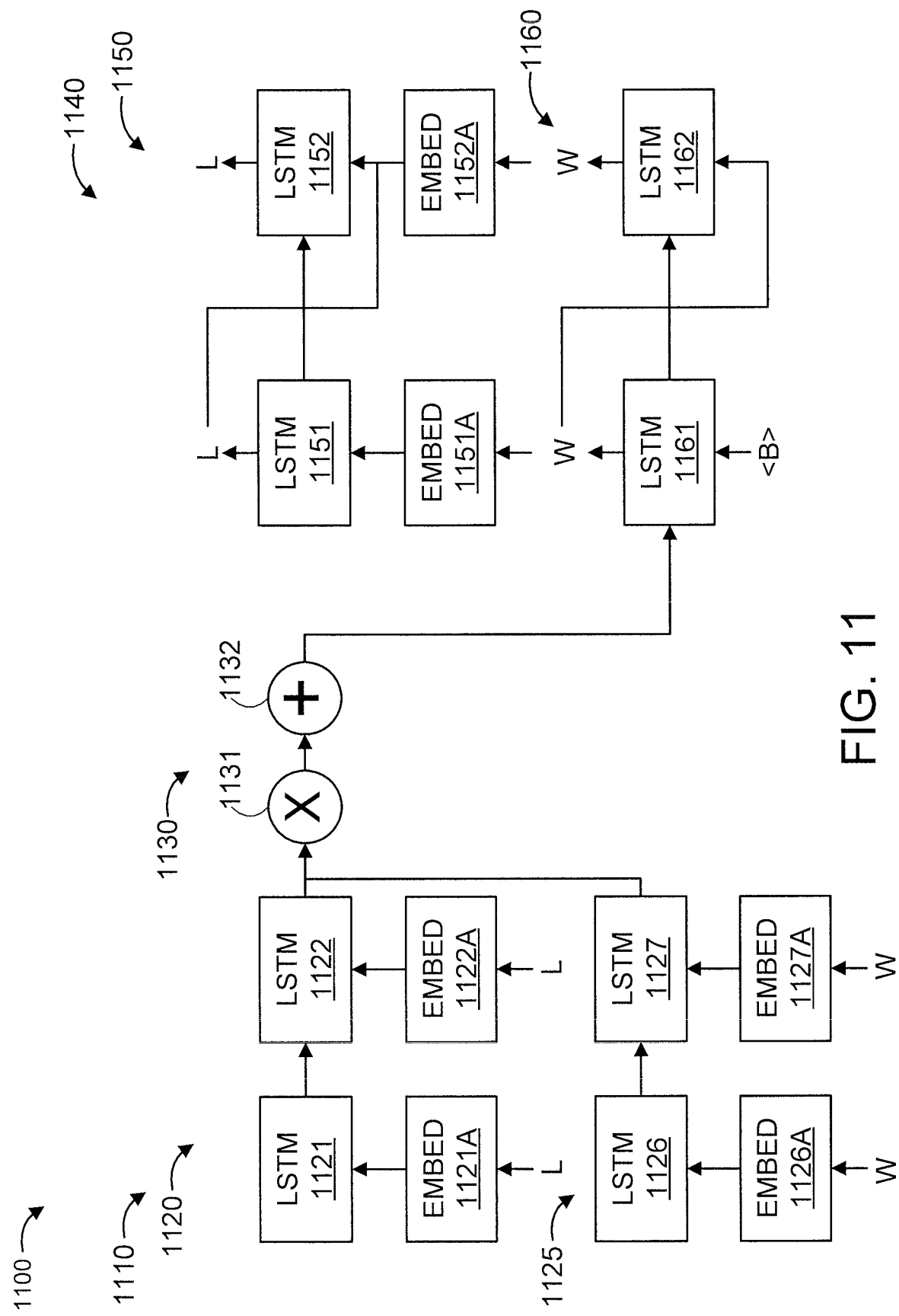
FIG. 11 shows still yet another exemplary encoder-decoder model architecture for performing step 310 of FIG. 3, in accordance with an embodiment of the present principles.

FIG. 11 shows still yet another exemplary encoder-decoder model architecture (hereinafter "architecture" in short) 1100 for performing step 310 of FIG. 3, in accordance with an embodiment of the present principles.

The architecture 1100 involves a weighted sum of Loss (L)+Loss(W) for sequence-to-sequence model training. The architecture uses the same word embedding for encoding and decoding. Switching W and L can be another option.

The architecture 1100 includes an encoder system 1110, a perturbation system 1130, and a decoder system 1140.

The encoder system 1110 includes a first encoder Long Short-Term Memory (LSTM) 1120 and a second encoder LSTM 1125. The first encoder LSTM 1120 has a first LSTM block 1121 and a second LSTM block 1122. The second encoder LSTM 1125 has a first LSTM block 1126 and a second LSTM block 1127. An embedding block 1121A is connected to the first LSTM block 1121, and an embedding block 1122A is connected to the second LSTM block 1122. An embedding block 1126A is connected to the first LSTM block 1126, and an embedding block 1127A is connected to the second LSTM block 1127. Each of the embedding blocks 1121A and 1122A receive a respective label (L), while each of embedding blocks 1126A, and 1127A receive a word (W).

The perturbation system 1130 includes a multiplicative perturbation generator 1131 and an additive perturbation generator 1132.

The decoder system 1140 includes a first decoder LSTM 1150 and a second decoder LSTM 1160. The decoder first LSTM 1150 has a first LSTM block 1151 and a second LSTM block 1152. The second decoder LSTM 1160 has a first LSTM block 1161 and a second LSTM block 1162. An embedding block 1151A is connected to the first LSTM block 1151, and an embedding block 1152A is connected to the second LSTM block 1152.

FIG. 12 shows an exemplary method 1200 for including perturbation to an encoded sequence, in accordance with an embodiment of the present principles.

At step 1210, set $p_a$ and $p_m$ between 0 and 1.

At step 1220, generate labeled data and train a slot filling model using the generated data.

At step 1230, select the best hyper-parameters according to the accuracy on the development set.

FIG. 13 shows another exemplary method 1300 for including perturbation to an encoded sequence, in accordance with an embodiment of the present principles.

At step 1310, feed manually trained data to the trained encoder-decoder model.

At step 1320, calculate variances of each element in $h_N$ and $c_N$.

At step 1330, use a large perturbation for the element with a large variance and a small perturbation for the element with a small variance.

A description will now be given regarding some of the many attendant advantages of the present principles. For example, as one advantage, by using two sequences for output of sequence-to-sequence modeling, new pairs of word and label that are not included in the training data can be acquired. As another advantage, adding some perturbations results in a wide variety of generated sequences. Due to the strong generation capability of the decoder LSTM, sequences that are similar, but not identical, to the input sequences, can be generated.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 14:
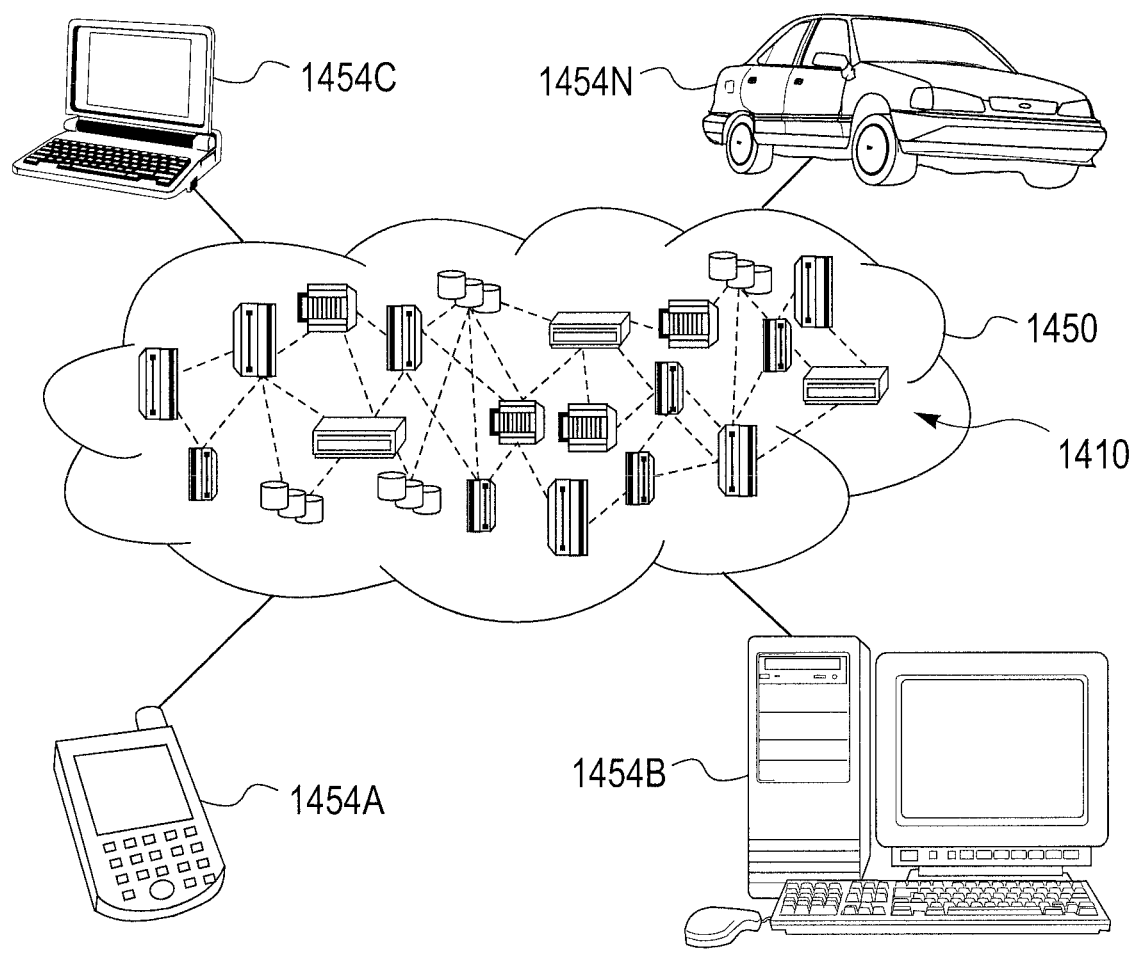
FIG. 14 shows an exemplary cloud computing environment, in accordance with an embodiment of the present principles.

Referring now to FIG. 14, illustrative cloud computing environment 1450 is depicted. As shown, cloud computing environment 1450 includes one or more cloud computing nodes 1410 with which local computing devices used by cloud consumers, such as, for example, personal digital assistant (PDA) or cellular telephone 1454A, desktop computer 1454B, laptop computer 1454C, and/or automobile computer system 1454N may communicate. Nodes 1410 may communicate with one another. They may be grouped (not shown) physically or virtually, in one or more networks, such as Private, Community, Public, or Hybrid clouds as described hereinabove, or a combination thereof. This allows cloud computing environment 1450 to offer infrastructure, platforms and/or software as services for which a cloud consumer does not need to maintain resources on a local computing device. It is understood that the types of computing devices 1454A-N shown in FIG. 14 are intended to be illustrative only and that computing nodes 1410 and cloud computing environment 1450 can communicate with any type of computerized device over any type of network and/or network addressable connection (e.g., using a web browser).

Figure 15:
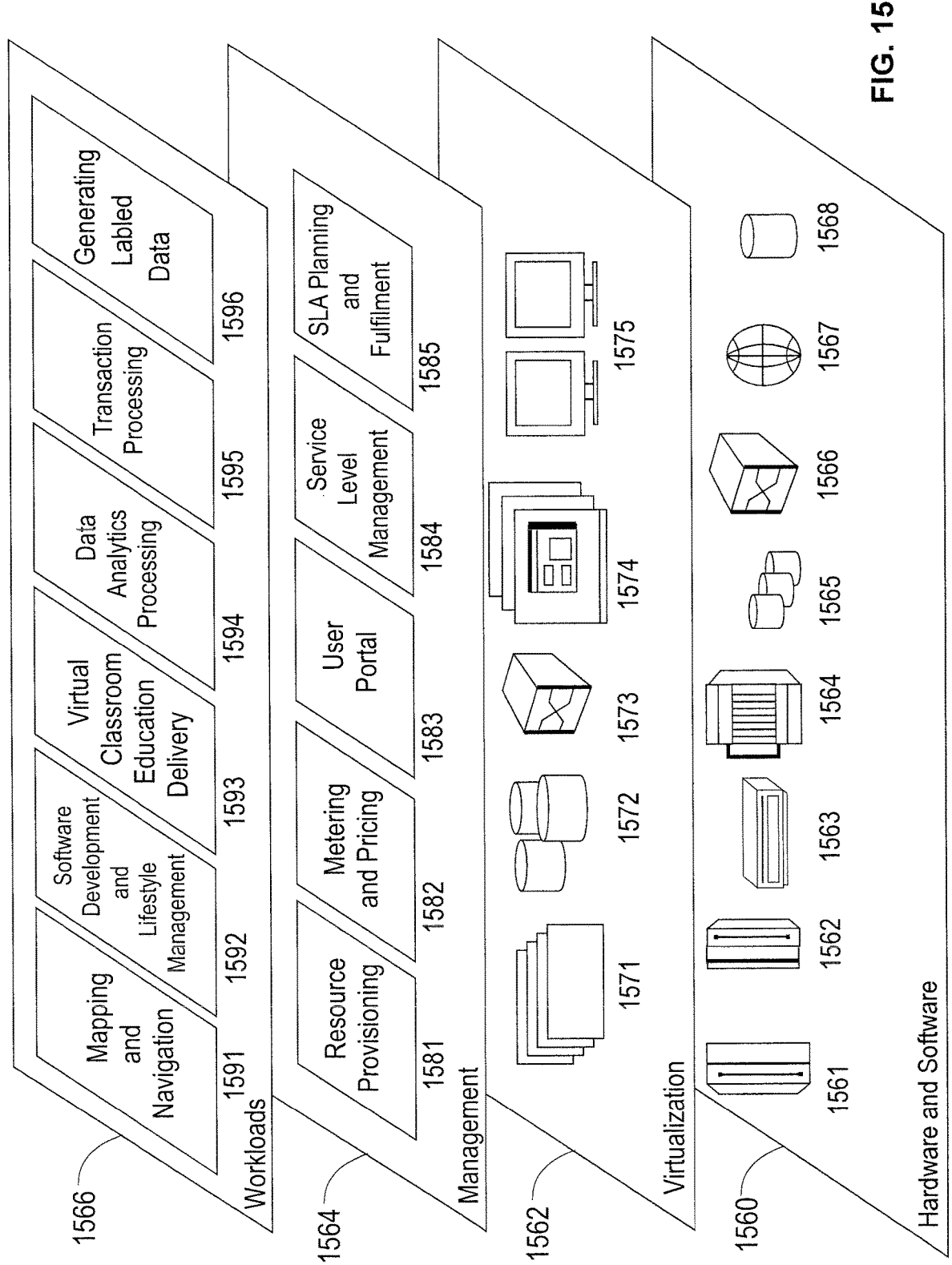
FIG. 15 shows an exemplary set of functional abstraction layers provided by the cloud computing environment shown in FIG. 14, in accordance with an embodiment of the present principles.

Referring now to FIG. 15, a set of functional abstraction layers provided by cloud computing environment 1450 (FIG. 14) is shown. It should be understood in advance that the components, layers, and functions shown in FIG. 15 are intended to be illustrative only and embodiments of the invention are not limited thereto. As depicted, the following layers and corresponding functions are provided:

Hardware and software layer 1560 includes hardware and software components. Examples of hardware components include: mainframes 1561; RISC (Reduced Instruction Set Computer) architecture based servers 1562; servers 1563; blade servers 1564; storage devices 1565; and networks and networking components 1566. In some embodiments, software components include network application server software 1567 and database software 1568.

Virtualization layer 1570 provides an abstraction layer from which the following examples of virtual entities may be provided: virtual servers 1571; virtual storage 1572; virtual networks 1573, including virtual private networks; virtual applications and operating systems 1574; and virtual clients 1575.

In one example, management layer 1580 may provide the functions described below. Resource provisioning 1581 provides dynamic procurement of computing resources and other resources that are utilized to perform tasks within the cloud computing environment. Metering and Pricing 1582 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1583 provides access to the cloud computing environment for consumers and system administrators. Service level management 1584 provides cloud computing resource allocation and management such that required service levels are met. Service Level Agreement (SLA) planning and fulfillment 1585 provide pre-arrangement for, and procurement of, cloud computing resources for which a future requirement is anticipated in accordance with an SLA.

Workloads layer 1590 provides examples of functionality for which the cloud computing environment may be utilized. Examples of workloads and functions which may be provided from this layer include: mapping and navigation 1591; software development and lifecycle management 1592; virtual classroom education delivery 1593; data analytics processing 1594; transaction processing 1595; and generating labeled data by sequence-to-sequence modeling with added perturbations to encoded information 1596.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for generating labeled data, comprising:
encoding, by a processor-based encoder comprising a first long short-term memory neural network, a first labeled data into an encoded representation of the first labeled data;

modifying the encoded representation into a modified representation by adding a perturbation involving independent random variables sampled from a uniform distribution within a given distribution range to hidden units and memory cells of the encoded representation; and decoding, by a processor-based decoder comprising a second long short-term memory neural network, the modified representation into a second labeled data, wherein the perturbation comprises sequential application of a multiplicative perturbation and an additive perturbation.

2. The method of claim 1, further comprising pre-training the processor-based encoder and the processor-based decoder to receive and generate a same labeled data.

3. The method of claim 1, wherein the encoded representation includes an encoded hidden vector and an encoded memory cell vector.

4. The method of claim 3, wherein said modifying step modified at least one of the encoded hidden vector and the encoded memory cell vector.

5. The method of claim 1, wherein the first labeled data is a first sequence of pairs of a word and a label and the second label is a second sequence of pairs of a word and a label.

6. The method of claim 1, wherein the processor-based decoder includes a first decoder unit and a second decoder unit, and the method comprises:

generating and outputting, by the first decoder unit, a sequence of words; and generating and outputting, by the second decoder unit, a sequence of labels.

7. The method of claim 6, wherein the first decoder unit and the second decoder unit having independent outputs.

8. The method of claim 6, wherein the first decoder unit and the second decoder unit having dependent outputs.

9. The method of claim 8, wherein at least one label in the sequence of labels is used to generate at least one word in the sequence of words.

10. The method of claim 8, wherein at least one word in the sequence of words is used to generate at least one label in the sequence of labels.

11. The method of claim 1, wherein the encoded representation includes an encoded hidden vector and an encoded memory cell vector, at least one of which is perturbed by said modifying step.

12. The method of claim 1, wherein said decoding step use arbitrary modeling units and modeling architectures selected from a plurality of available modeling units and a plurality of available modeling architectures.

13. A computer program product for generating labeled data, the computer program product comprising a non-transitory computer readable storage medium having program instructions embodied therewith, the program instructions executable by a computer to cause the computer to perform a method comprising:

encoding, by a processor-based encoder comprising a first long short-term memory neural network, a first labeled data into an encoded representation of the first labeled data;

modifying the encoded representation into a modified representation by adding a perturbation involving independent random variables sampled from a uniform distribution within a given distribution range to hidden units and memory cells of the encoded representation; and decoding, by a processor-based decoder comprising a second long short-term memory neural network, the modified representation into a second labeled data, wherein the perturbation comprises sequential application of a multiplicative perturbation and an additive perturbation.

14. The computer program product of claim 13, further comprising pre-training the processor-based encoder and the processor-based decoder to receive and generate a same labeled data.

15. The computer program product of claim 13, wherein the encoded representation includes an encoded hidden vector and an encoded memory cell vector.

16. The computer program product of claim 15, wherein said modifying step modified at least one of the encoded hidden vector and the encoded memory cell vector.

17. A system for generating labeled data, comprising:

a processor and a memory, configured to:

encode, using a first long short-term memory neural network, a first labeled data into an encoded representation of the first labeled data;

modify the encoded representation into a modified representation by adding a perturbation involving independent random variables sampled from a uniform distribution within a given distribution range to hidden units and memory cells of the encoded representation; and decode, using a second long short-term memory neural network, the modified representation into a second labeled data, wherein the perturbation comprises sequential application of a multiplicative perturbation and an additive perturbation.

18. A method for generating labeled data, comprising:

encoding, by a long short-term memory processor-based encoder, a first labeled data into an encoded representation of the first labeled data, the encoded representation having an encoded hidden vector and an encoded memory cell vector;

modifying the encoded representation into a modified representation by adding a perturbation involving independent random variables sampled from a uniform distribution within a given distribution range to hidden units and memory cells of the encoded representation, the perturbation selected from the group consisting of an additive perturbation and a multiplicative perturbation; and decoding, by a long short-term memory processor-based decoder, the modified representation into a second labeled data, wherein the perturbation comprises sequential application of a multiplicative perturbation and an additive perturbation.

19. The method of claim 18, wherein the long short-term memory processor-based decoder includes a first decoder unit and a second decoder unit, and the method comprises:

generating and outputting, by the first decoder unit, a sequence of words; and generating and outputting, by the second decoder unit, a sequence of labels.

20. The method of claim 19, wherein the first decoder unit and the second decoder unit having independent outputs.

21. The method of claim 19, wherein the first decoder unit and the second decoder unit having dependent outputs.

22. The method of claim 21, wherein at least one label in the sequence of labels is used to generate at least one word in the sequence of words.

23. The method of claim 21, wherein at least one word in the sequence of words is used to generate at least one label in the sequence of labels.

* * * * *